US006706415B2

(12) United States Patent
Cooper et al.

(10) Patent No.: US 6,706,415 B2
(45) Date of Patent: Mar. 16, 2004

(54) MARINE COATING

(75) Inventors: Kirk E. Cooper, Troy, OH (US); Marc J. Scancarello, Troy, OH (US); Todd A. DeVore, Wapakoneta, OH (US); Don G. Reu, Fort Madison, IA (US)

(73) Assignee: Copeland Corporation, Sidney, OH (US)

(*) Notice: Subject to any disclaimer, the term of this patent is extended or adjusted under 35 U.S.C. 154(b) by 42 days.

(21) Appl. No.: 09/750,448

(22) Filed: Dec. 28, 2000

(65) Prior Publication Data

US 2003/0194576 A1 Oct. 16, 2003

(51) Int. Cl.[7] .......................... B32B 15/04; B32B 15/16; B32B 15/20; F04B 39/00

(52) U.S. Cl. ........................ 428/548; 428/550; 428/551; 428/553; 428/564; 428/539.5; 417/572

(58) Field of Search ................................ 428/548, 550, 428/551, 553, 564, 539.5; 417/572

(56) References Cited

U.S. PATENT DOCUMENTS 3,010,843 A 11/1961 Eder
3,092,306 A 6/1963 Eder
5,223,052 A 6/1993 Yamamoto et al.
5,875,702 A * 3/1999 Kawagoe et al. ........... 417/269
5,958,522 A * 9/1999 Nakagawa et al. ......... 427/455
6,026,731 A * 2/2000 Hinrichs et al. ............ 417/269
6,079,963 A 6/2000 Endo et al.
6,116,876 A 9/2000 Kitano et al.
6,123,009 A * 9/2000 Kanayama et al. ........... 91/499
6,142,755 A 11/2000 Shiinoki et al.
6,174,150 B1 1/2001 Tsubono et al.
6,217,295 B1 * 4/2001 Kato et al. ............... 417/222.2
6,337,141 B1 * 1/2002 Yamada et al. ............. 428/553
6,378,415 B1 * 4/2002 Sugiura et al. ............... 92/155

FOREIGN PATENT DOCUMENTS

| | | | |
|---|---|---|---|
| DE | 198 33 604 A1 | | 2/1999 |
| GB | 639676 | | 7/1950 |
| GB | 852273 | | 10/1960 |
| JP | 63 050455 | A | 3/1988 |
| JP | 01 108356 | A | 4/1989 |
| JP | 03 075351 | A | 3/1991 |
| JP | 2000 336306 | A | 12/2000 |
| RU | 2 065 085 | | 8/1996 |

* cited by examiner

*Primary Examiner*—Deborah Jones
*Assistant Examiner*—Jason Savage
(74) *Attorney, Agent, or Firm*—Harness, Dickey & Pierce, P.L.C.

(57) ABSTRACT

A compressor having a corrosive resistant coating is disclosed. The coating has a first spray coated metallic layer. A sealant layer is disposed over the sprayed metallic coating which has an organic component, a solvent component, and an inorganic phase.

21 Claims, 2 Drawing Sheets

MARINE COATING

BACKGROUND OF THE INVENTION

1. Field of the Invention

This invention relates generally to compressors and refers more particularly to a protective coating that reduces corrosion for a compressor.

2. Discussion of the Related Art

The outer shell of most compressors is composed of either a low carbon hot-or cold rolled steel stamping or gray cast iron. The steel or cast iron, without a corrosion protectant coating, would typically corrode at a fast rate even in a non-marine environment. For conventional compressor applications, the outer surface of the compressor body is painted to minimize corrosion. Corrosion mitigation is important not only to extend the useable life of the compressor, but also to prevent premature failure of the pressurized shell which may result in personal injury.

The steel compressor's outer surface is composed of several stamped steel components that are assembled together primarily by welding. Welding, in itself, causes the surface of the steel be even more prone to corrosion due to several metallurgical factors, two of which are hindering paint adhesion and forming pinholes. The cast iron compressor version is composed of several iron castings assembled together by fasteners. In the case of gray cast iron, corrosion is also prone mainly because of the intrinsic presence of graphite within the cast iron. Graphite encourages corrosion because of the galvanic difference between iron and graphite, which causes preferential corrosion of the iron matrix. Therefore, it is obvious to any expert in the corrosion field that the aforementioned compressor types are highly likely to corrode, especially in extreme environments.

The painting process mentioned as the prior art, has the following sequence of events associated with it's application: Liquid chemical cleaning of the steel or iron surface to remove organic and inorganic contamination, phosphatizing the cleaned surface (creating an iron phosphate layer that aids in the adhesion of the paint), sealing the phosphated coating (sealing controls the phosphating reaction and prepares the surface for painting), painting the compressor (either with a powder electrostatic spraying, dipping or liquid spraying methods), curing the paint either at room temperature or at elevated temperatures.

Typically, the painted compressor must pass several standard test methods to be considered acceptable. ASTMB-117 is one such standard test method. With the paint quality associated with the prior art, it is conceivable that the compressor would pass the standard test methods and still have signs of corrosion of the underlying steel or iron (red rust) visible at localized regions on the painted surface. For most applications, this sporadic red rust is normal and would not affect the functionality of the compressor for the life of the compressor.

However, certain compressor applications require very high reliability and can not succumb to a corrosion failure without great loss. These stringent applications require no visible red rust corrosion on the surface for an extended period of time (as mentioned: despite the fact that it passed ASTM testing). An example of such an application would be climate controlled marine containers that are transported across the ocean. Marine environments are especially corrosion causing because of the presence of salts and other corrosion enhancing constituents found in seawater. The "containers" may be exposed to marine mist or even periodically come in contact with seawater due to splashing. Temperature fluctuations and direct sun light may also be present (which includes the deleterious effect of ultraviolet rays). These containers need to be refrigerated uninterrupted for the entire journey to protect the enclosed cargo. These are high reliability requiring applications, where failure of the compressor would not be easily repairable and would result in large monetary damages if the climate control system ceased to function. This represents an extraordinary challenge considering the especially corrosion inducing marine environment.

The painting procedure described as the prior art does not have a high enough corrosion preventative property associated with it. The prior art, although acceptable for most applications, does not fulfill the requirements of preventing "no visible red rust" during the life of the compressor. The prior art has a weakness in that when nicks or dings occur due to, for example, accidental impact or scratching damage during compressor handling or preventative maintenance, the paint cracks and exposes bare steel which then corrodes at an accelerated rate. The prior art paint process serves only to provide a weak barrier coating. Once this coating is penetrated to the underlying steel, corrosion immediately occurs. Bare metal exposed in this manner will corrode quickly because there is no strong "cathodic protection" provided by the prior art's paint. This is a weakness of the prior art especially because of the long hours the compressors are exposed to corrosive environments.

SUMMARY OF THE INVENTION

In accordance with the teachings of the present invention, a compressor system is provided which is coated with an environmental protective coating. The coating is comprised of two or three layers, the first being a sprayed porous metallic layer disposed on the compressor. The second layer being a organic based surface layer disposed on the sprayed metallic layer for sealing the metallic layer pores and the optional third layer being an organic based topcoat finish used for cosmetic reasons as well as to further enhance corrosion resistance.

The sprayed metallic layer is formed by powder flame spraying, wire flame spraying, or electric arc spraying. The metallic layer thickness should be between 0.010 to 0.015 inches. The sprayed metallic layer should have a tensile bond adhesion level of at least 1,000 psi.

Also disclosed is a method of having the steps of treating the surface of the compressor with an abrasive grit to a suitable finish. After the surface of the compressor is treated, a metallic coating is thermally sprayed onto the treated surface of the compressor. A organic-based sealer and an optional top coat finish are then applied to the metallic coating to seal the pores within the thermally sprayed layer.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

Figure 1:
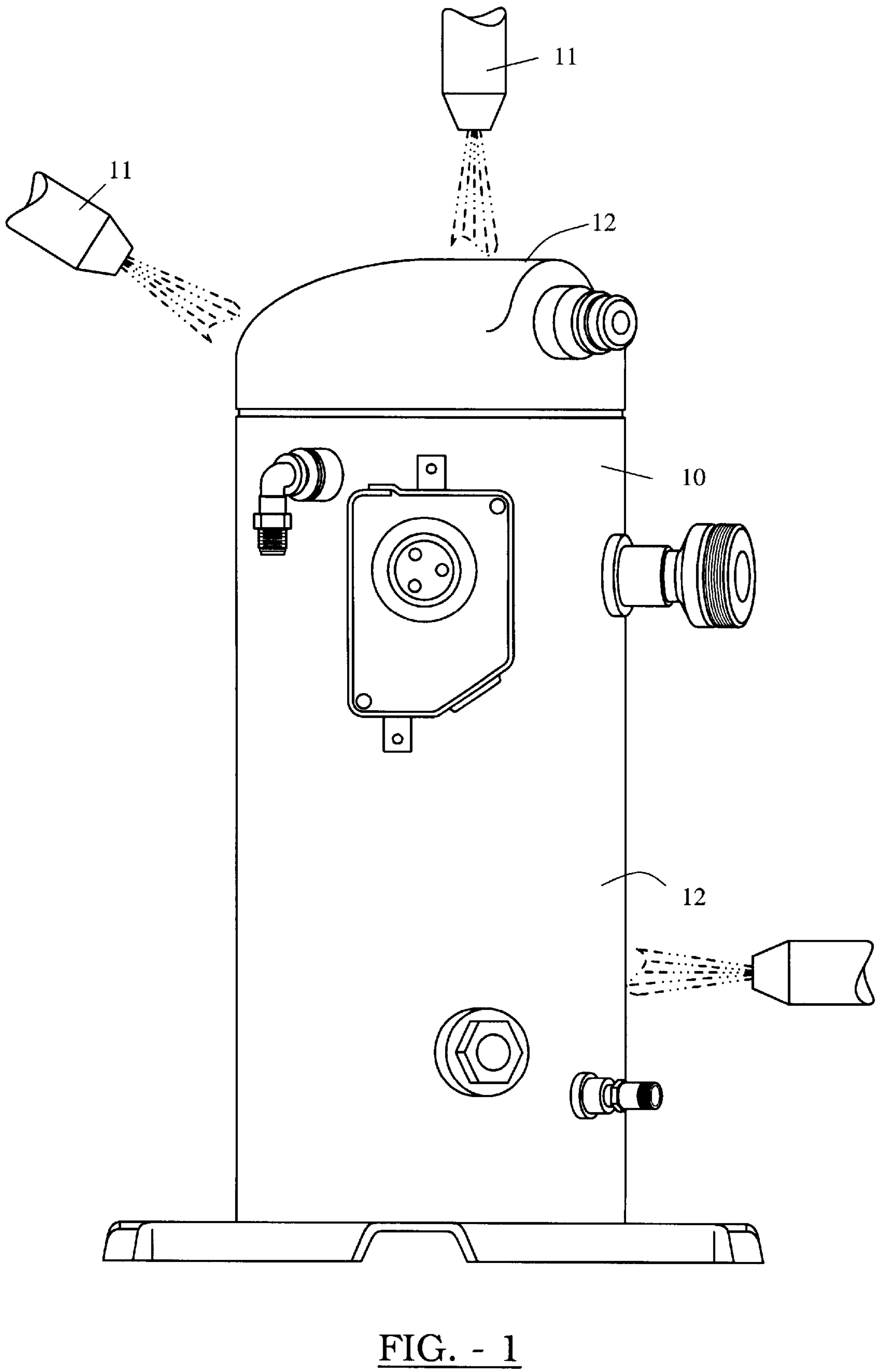
FIGS. 1–3 show parts of the compressor main body in various stages of the processing.
Figure 2:
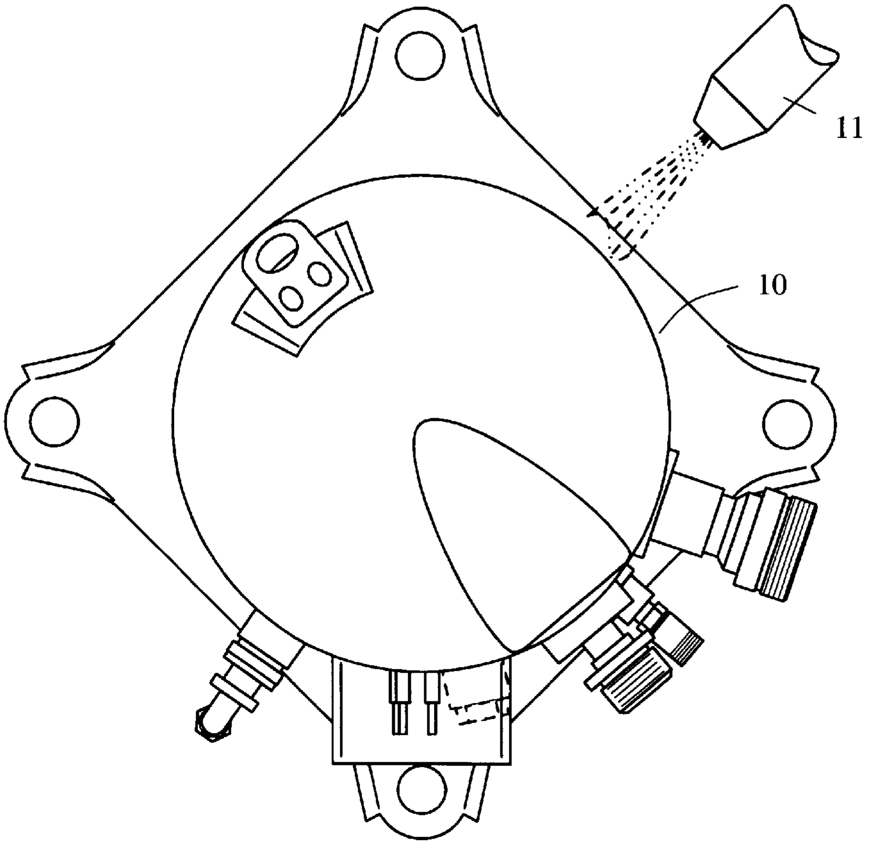
Figure 3:
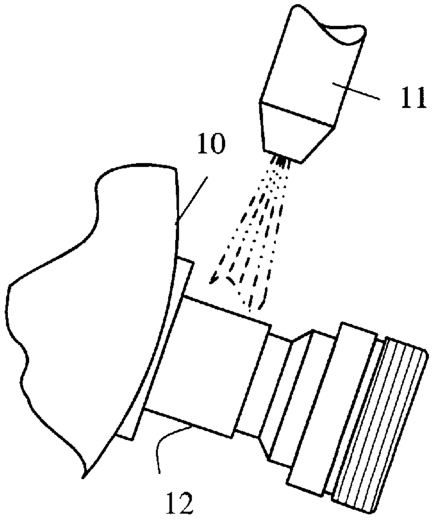

FIGS. 1–3 show the parts of the compressor main body 10 in the various stages of processing. As can be seen, the spray head 11 from the thermal sprayer apparatus is shown applying the metallic coating layer 12 onto the surface of the compressor.

The coating system of the present invention provides a strong "barrier" property because of the sprayed metallic layer 12. The form and composition of the sprayed metallic layer 12 described herein is ductile and very adherent to the underlying steel. Therefore, if accidental impact occurs, such as with a wrench, the aluminum will just dent and smear and still remain basically in tact and still cover or protect the steel. The sprayed metallic layer 12, of course, must be thick enough to supply this property.

Moreover, the electrochemical galvanic potential relationship between the sprayed metallic layer 12 and steel are such that the steel or iron compressor housing 10 becomes protected even when bare steel or iron regions are locally exposed to the corrodant. The sprayed metallic, which is preferably an aluminum coating, is sacrificial to the steel and therefore protects the steel from corroding. The approximate relationship describing this is as follows: Service Life in Years=(0.64×Aluminum Coating Thickness (micrometers))/Percent Surface Area As Bare Steel.

The first step in the present invention is to clean the outer surfaces of the compressor body 10 to be coated of all grease, oil or other organic contamination. An aqueous alkaline cleaning system will suffice. In the case of gray cast iron an additional step may be needed depending upon condition of the cast iron surface. Graphite present on the surface of the cast iron may inhibit adhesion of the metallic coating. A special chemical treatment may be necessary to remove some or most of the exposed surface graphite. One such method is known in the industry as Kolene Electrolytic Salt process. It is understood that there may be other methods that are more economical in the industry that will serve the same purpose. In certain cases, this graphite removal step may not be necessary depending upon the quality of the casting surface and the effectiveness of the grit blasting.

It is preferable that the compressor's outer surface is first thoroughly treated by abrasive grit blasting. The blasting must be sufficient enough to satisfy the surface finish requirements of SSPC SP 5 or NACE#1"White Metal". Proper surface preparation by blasting is critical to produce a well adhering thermally sprayed metallic coating. This roughened surface texture not only removes surface contamination by exposing fresh steel or iron, but also serves to mechanically anchor the aluminum coating firmly to the substrate. Angular hard steel grit of mesh size of about 25–40 can be used, but the preferred grit media is aluminum oxide with a mesh size of about 16–30. It is preferred that the indentation that the shot makes on the surface of the steel or iron is angular in shape and not spherical. Better adhesion of the aluminum occurs with an irregular surface texture formed by angular-shaped grit particles. The resulting surface finish of the substrate after blasting shall have an anchor tooth pattern with a surface profile of about 50–75 micrometers (002–003 inch) measured by ASTM D 4417 Method A or B. The use of steel shot, typically used in shot peening or for other routine cleaning purposes may not supply the needed angular surface finish defined herein and may cause lack of good adhesion of the aluminum coating. Blasting shall not be so severe as to distort any part of the compressor. It is critical that 100% of the surfaces to be metallized be cleaned.

Regions of the compressor body 10 that should not be blasted should be masked. An example of such a component would be an electrical connection, a site glass, or internal coupling threads.

After the compressor body 10 is blasted, it must be thermally sprayed within a certain maximum time limit of four hours to obtain the best coating adhesion. This is to avoid the formation of flash rust or other forms of surface contamination that would otherwise inhibit adhesion of the aluminum. The surface quality of the ferrous substrate must be SSPC SP 5 "white metal" just prior to spraying.

The substrate to be sprayed may be sprayed at room temperature, but to assure no moisture is present, local heating of the area to be sprayed shall be done. The surface temperature of the substrate should not exceed 250 Fahrenheit. As an alternative, the compressor body 10 may be placed in an oven at 250F. to eliminate any surface moisture prior to aluminizing. The ambient air temperature shall be about 5 degrees Fahrenheit minimum above the dew point.

As shown in FIGS. 1–3, the incident angle of the metallic spray should be as close to 90 degrees as possible. The angle should not be less than 45 degrees. It has been shown that coating porosity increases as the incident angle is reduced below 90 degrees. Distance of the spray gun to compressor body 10 shall not farther than 8 inches for similar reasoning.

The most preferred composition is pure aluminum (99.9% minimum purity). The metal system deposited on the steel may be an aluminum alloy, having less than about 10% magnesium. An alloyed aluminum metal system preferably has less than about 5% magnesium, which has good corrosion resistance. Aluminum/Zinc alloys should be avoided in marine corrosion conditions, because they have less corrosion resistance because of its solubility in salt water. The thickness of the aluminum shall be such that there is no interconnected porosity from the atmosphere to the base steel or iron substrate. This condition helps to prevent corrosion of the substrate. To help avoid this porosity problem, the thickness of aluminum must be about 010 to 015 inch in thickness. The aluminum coating thickness should be measured with an eddy current, ultrasonic or magnetic induction type instruments. The tensile bond adhesion strength of the aluminized coating must be 1000 PSI minimum as checked with the Elcometer Model 106 adhesion tester in accordance with ASTM D 4514. The wire diameter of the aluminum shall be about 0625 inch. The nozzle gas pressure during aluminizing shall be about 55 PSI.

The metallic coating can be Powder Flame Sprayed or Wire Flame Sprayed, but the preferred method is by Electric Arc Wire Spraying. Electric Arc Wire Spraying exhibits a higher quality coating and is more economical than flame spraying for this application. Electric Wire Arc Spraying is performed by contacting two aluminum wires which are at a potential to each other and generating a melt inducing arc. This arc is in proximity to a forced gas or air jet. The gas may be an inert gas, but for economic reasons, dry and cleaned compressed air may be used.

The aluminum wire becomes molten in the vicinity of the arc and the gas jet atomizes the aluminum and forces the droplets to impinge upon the steel or iron substrate. The droplets of aluminum impinge upon the steel and build up layer-by-layer until the desired thickness is achieved. The droplets start to cool and partially solidify prior to impingement. The kinetic energy of the droplets cause deformation and flattening of the aluminum particles as they hit the steel forming a uniform layer of aluminum on the steel or iron surfaces. Because of the nature of this deposition process, a small amount of porosity forms between the particles of aluminum. To maximize corrosion resistance, interconnected porosity (porosity that connects the marine atmosphere with the underlying ferrous substrate), must not exist. To prevent this, a sufficient amount of aluminum must be deposited and an adequate sealer must be employed to block the pores. The coating must be applied in multiple, thin even coatings and not heavily applied in one spray. It has been found advantageous, for completeness of coating, to perform spray strokes at 90 degrees from each other and to allow some overlap for each subsequent spray stroke. The practical application of this process dictates that it be automated and applied by a robot or similar technology. This will assure consistency and completeness of the coating. The grit blasting, described above, shall also be automated for the same reasons. The complex shape of a compressor makes it difficult to consistently coat or blast manually. Automation assures that all areas of the compressor are adequately treated.

After thermal spraying the compressor, a seal coating is applied. The purpose of a sealing step is to fill any porosity present in the thermally sprayed metal coating and to further enhance corrosion resistance. If a sealer is used without a top coat finish, it shall exhibit ultraviolet radiation stability from exposure to the sun. This step enhances the corrosion resistance of the metallized coating and increases the useable life of the aluminized compressor. When only a sealer is used, the sealer also serves to produce a cosmetically acceptable aluminized compressor. The aluminized compressor must not exhibit dark blotches, which occur if improperly sealed or if an inadequate sealer is used.

Several properties of the sealer must be unique to this compressor application. Therefore a special custom formulated sealer has been invented. The viscosity of the seal must be low enough so that the coating wicks into the pores and does not agglomerate on the surface. The thickness of the seal coat should not be greater than about 002 inch dry film thickness over the top of the aluminized coating. No moisture should be present on the surface of the metallized compressor prior to sealing unless the sealer is a water-based type. If moisture is present, the compressor shall be heated to 250° F. to remove moisture prior to the application of the sealant. Application of the seal coat should take place within about 24 hours of metallizing for optimal results. Ultraviolet protection properties should also be incorporated into the seal coat if no topcoat is used.

In addition, the chosen seal coat type must be such that it will withstand a constant compressor operating temperature of 300° F. Only certain regions of the compressor's surface may reach this magnitude of temperature, therefore the sealer must not discolor in the heated region and remain uncolored in the non-heated region so as to produce a two-tone appearance. After long term exposure to 300 F., the sealant must not degrade it's corrosion preventing sealing properties. Moreover, the sealer must retain it's all of the stated properties after exposure to normal compressor oils such as; polyol ester, mineral oils, etc. Accidental spillage of these oils may occur that exposes the aluminized and sealed surface to such oils.

The application of the sealant may be by brushing, spraying or dipping into the sealant. For the same reasons as above, the sealer shall be applied in a consistent manner that preferably utilizes automation. The curing process for the sealant should not exceed 300 F. as to not damage the internal components of the compressor due to excessive thermal degradation. The sealant should coat the compressor uniformly without agglomeration, which exceeds the required sealer thickness.

There are several chemical families that will meet the aforementioned requirements. Generally, the customized sealant described herein will have a carrier, an organic component, and an inorganic component. The first sealer consists of a silicon resin acrylic sealant containing: parachlorobenzotriflouride, phenyl propyl silicone, mineral spirits, high solids silicone, acrylic resin and cobalt compounds. Additionally, particulates such as aluminum and/or silica can be incorporated. The silicon resin coating has good U.V. stability and is stable at 300° F. Applying two coats of about 001 inch dry film thickness each has been found to achieve better results than one coat at about 002 inch thickness.

Another possible sealant coating is an epoxy polyamide with n-butyl alcohol, C8, C10 aromatic hydrocarbons, zinc phosphate compounds and amorphous silica.

The final coating considered acceptable for this application is a cross-linked epoxy phenolic with an alkaline curing agent. The adherence and performance of this sealant shall be enhanced by first applying an aluminum conversion coating on top of the thermally sprayed aluminum. Two such conversion coatings known in the industry are Alodine or Iridite. The epoxy phenolic is then applied over the conversion coating.

Top coat finishes shall be of higher viscosity and similar in nature to paints. The maximum topcoat thickness shall be about 004 inch. The topcoat is applied over the sealer. The topcoat shall not be too thick as to negate the cathodic protective properties of the underlying thermally sprayed coating. For cosmetic reasons, it is preferable that dark coloring agents such as carbon black be added to the sealant or top coat to achieve a black or gray color. Moreover, the topcoat must be compatible with the sealer to maintain good adhesion. Top coat finishes should not be applied over an un-sealed aluminized coating.

The following are topcoat finishes that comply with the cosmetic and functional requirements sefforth herein: The first topcoat finish is a polyurethane polymer with curing agents containing ethyl acetate, hexamethylene diisocyanate, homopolymer of HDI, n-butyl acetate and fine aluminum particles. This sealant also complies with the requirements of this application. The color of this top coat is gray-black.

Yet another top coat coating is a neutral urethane base acrylic with ethyl benzene, methyl ketone, xylene, aromatic naphtha, barium sulfate, and 1,2,4 trimethyl benzene and a polyisocyanate curing agent. The color of this product is black. The final top coat finish considered is an epoxy polyamide which contains magnesium silicate, titanium dioxide, black iron oxide, butyl alcohol and naptha. The color of this product is haze gray.

A wide variety of features can be utilized in the various materials disclosed and described above. The foregoing discussion discloses and describes a preferred embodiment of the present invention. One skilled in the art will readily recognize from such discussion, and from the accompanying drawings that various changes, modifications, and variations can be made therein without departing from the true spirit and fair scope of the invention.

What is claimed is:

1. A compressor having a protective coating disposed on an outside surface of the compressor, the protective coating comprising:

a sprayed metallic layer disposed on the outside surface of a shell housing of the compressor; and an organic based surface layer disposed on the sprayed metallic layer.

2. The compressor of claim 1 wherein the sprayed metallic layer is a flame sprayed layer.

3. The compressor of claim 2 wherein the flame sprayed layer is a powder flame sprayed layer.

4. The compressor of claim 2 wherein the flame sprayed layer is a wire flame sprayed layer.

5. The compressor of claim 1 wherein the sprayed metallic layer is formed by electric arc wire spraying.

6. The compressor of claim 1 wherein the sprayed metallic layer comprises aluminum.

7. The compressor of claim 6 wherein the sprayed metallic layer further comprises magnesium.

8. The compressor of claim 7 further comprising less than 10 percent magnesium.

9. The compressor of claim 7 wherein the metallic layer comprises less than about 5 percent magnesium.

10. The compressor of claim 6 wherein the metallic layer comprises more than about 99 percent aluminum.

11. The compressor of claim 1 wherein the sprayed metallic layer has a thickness of between 0.010 to 0.015 micrometers.

12. The compressor of claim 1 wherein the sprayed metallic layer has an adhesion strength between the compressor and the sprayed metallic layer of at least 1,000 psi.

13. The compressor of claim 1 wherein the sprayed metallic layer comprises flattened droplets of metal.

14. The compressor of claim 1 wherein the sprayed metallic layer is a porous coating.

15. A compressor having a housing vessel with an exterior surface and a protective coating disposed on the exterior surface, the protective coating comprising:

a sprayed aluminum layer disposed on the exterior surface of the housing vessel; and an organic surface layer disposed on the sprayed aluminum layer.

16. The compressor of claim 15 wherein the organic surface layer comprises a carrier, and an organic compound.

17. The compressor of claim 16 wherein the organic surface layer further comprises inorganic particulate.

18. The compressor of claim 17 wherein the inorganic particulate comprises aluminum.

19. The compressor of claim 15 wherein the organic surface layer comprises an ultraviolet stabilizer.

20. The compressor of claim 15 wherein the organic surface layer can withstand greater than 300° F. exposure without degradation.

21. The compressor of claim 15 wherein the organic based surface layer has a thickness of less than 0.002 inch.

* * * * *

UNITED STATES PATENT AND TRADEMARK OFFICE

CERTIFICATE OF CORRECTION

PATENT NO. : 6,706,415 B2
DATED : March 16, 2004
INVENTOR(S) : Kirk E. Cooper et al.

It is certified that error appears in the above-identified patent and that said Letters Patent is hereby corrected as shown below:

Column 1,
Line 12, "hot-or" should be -- hot or --.
Line 24, after "steel" insert -- to --.
Line 38, "it's" should be -- its --.

Column 2,
Line 38, "a" should be -- an --.
Line 52, "A" should be -- An --.

Column 4,
Line 24, after "not" insert -- be --.
Lines 37-38, "010 to 015" should be -- .010 to .015 --.
Line 44, "0625" should be -- .0625 --.

Column 5,
Line 36, "002" should be -- .002 --.
Lines 52 and 63, "300 F" should be -- 300° F --.
Line 53, "it's" should be -- its --.
Line 54, after "retain" delete "it's".

Column 6,
Line 11, "001" should be -- .001 --.
Line 12, "002" should be -- .002 --.
Line 27, "004" should be -- .004 --.
Line 37, "setforth" should be -- set forth --.
Line 50, "naptha" should be -- naphtha --.

UNITED STATES PATENT AND TRADEMARK OFFICE

CERTIFICATE OF CORRECTION

PATENT NO. : 6,706,415 B2
DATED : March 16, 2004
INVENTOR(S) : Kirk E. Cooper et al.

It is certified that error appears in the above-identified patent and that said Letters Patent is hereby corrected as shown below:

Column 7,
Line 21, "micrometers" should be -- inches --.

Signed and Sealed this

Twenty-third Day of May, 2006

JON W. DUDAS
*Director of the United States Patent and Trademark Office*